United States Patent [19]

Kanemaru et al.

[11] Patent Number: 4,842,881

[45] Date of Patent: Jun. 27, 1989

[54] COATING 5'-NUCLEOTIDE

[75] Inventors: Toshihiko Kanemaru, Nagaokakyo; Hiroshi Kasai, Kawabe; Takeshi Toyota, Kyoto, all of Japan

[73] Assignee: Takeda Chemical Industries, Ltd., Osaka, Japan

[21] Appl. No.: 275,652

[22] Filed: Nov. 21, 1988

Related U.S. Application Data

[63] Continuation of Ser. No. 41,250, Apr. 22, 1987, abandoned.

[30] Foreign Application Priority Data

Apr. 22, 1986 [JP] Japan .................................. 61-94258

[51] Int. Cl.$^4$ ............................................ A23L 1/229
[52] U.S. Cl. ...................................... 426/307; 426/99; 426/537; 426/650
[58] Field of Search ................... 426/307, 96, 99, 537, 426/650

[56] References Cited

U.S. PATENT DOCUMENTS

| | | | |
|---|---|---|---|
| 3,389,000 | 6/1968 | Fujita et al. | 426/537 X |
| 3,524,747 | 8/1970 | O'Hara et al. | 426/537 |
| 3,709,701 | 1/1973 | Samejima et al. | 426/537 |
| 4,806,370 | 2/1989 | Toyota et al. | 426/537 X |

FOREIGN PATENT DOCUMENTS

| | | |
|---|---|---|
| 40-3467 | 2/1965 | Japan . |
| 42-1470 | 1/1967 | Japan . |
| 56-96680 | 4/1981 | Japan . |
| 58-94366 | 4/1983 | Japan . |
| 61-238335 | 10/1986 | Japan . |
| 62-255 | 1/1987 | Japan . |
| 62-29956 | 2/1987 | Japan . |

*Primary Examiner*—Joseph Golian
*Attorney, Agent, or Firm*—Wenderoth, Lind & Ponack

[57] ABSTRACT

Seasoning composition is produced with a method, which comprises coating fine particles of water-soluble 5'-ribonucleotides having a total water content not exceeding about 14 weight % and a particle diameter not exceeding about 250 μm with an oil/fat and/or a wax melting at a between about 55° C. to about 90° C. The thus obtained seasoning composition is applicable with advantage to foods which are subjected to heating beyond the melting point of the coating material for giving taste of the 5'-ribonucleotides because of good protection from degradation due to phosphatase.

5 Claims, No Drawings

COATING 5'-NUCLEOTIDE

This application is a continuation of now abandoned application Ser. No. 041,250 filed Apr. 22, 1987.

The present invention relates to a method for production of seasoning composition stabilized against enzymes which comprises coating water-soluble 5'-ribonucleotides with an oil/fat and/or a wax.

Flavorant 5'-ribonucleotides such as sodium 5'-inosinate and sodium 5'-guanylate not only have their own characteristic tastes but have the property to produce potentiated tastes when used in combination with sodium L-glutamate and other flavorants so that they are indispensable seasonings alongside of sodium L-glutamate in the manufacture of processed foods today.

These 5'-ribonucleotides are very stable under the ordinary food processing conditions and against pH in the range encountered in the field of foodstuffs, so that they are little decomposed whether chemically or physically. However, these substances have the disadvantage that the ester bond in the 5'-position is very vulnerable to the attack of phosphatase so tha they easily lose their flavorant quality. Thephosphatase mentioned above is an enzyme widely distributed in animal and vegetable materials and fermented foods.

Heretofore, in the manufacture of foods from raw materials containing phosphatase activity, the following measures have been taken to protect 5'-ribonucleotides against degradation by this enzyme. Thus, for example, the enzyme is inactivated by heat treatment before addition of 5'-ribonucleotides. Or for the purpose of inhibiting this enzyme, dehydroascorbic acid or penicillamine esters are added (Japanese Patent Publication No. 46-16948 and No. 48-10228, for instance). Another known method comprises coating 5'-ribonucleotides with a coating agent which is solid at room temperature and resistant to water but is destroyed when heated (Japanese Patent Publication No. 421470). Still another known method comprises coating them with zein or polyvinyl butyral.

There are many reports pointing to the effectiveness of coating 5'-ribonucleotides before the addition thereof to those foods which contain high phosphatase activity and are heated after addition of various seasoning agents (e.g. steamed and kneaded fish pastes such as kamaboko, chikuwa, etc. and kneaded animal meat products such as sausages) or those foods which are preferably not heated in order to preserve their flavors. However, practically satisfactory products have not been obtained by any of the known coating methods. It is suspected, that this is because of insufficient cladding or a low affinity of 5'-ribonucleotides for oils/fats after coating, and the 5'-ribonucleotides are too ready to dissolve out in the presence of water and are decomposed by phosphatase.

The present invention is intended to provide coated water-soluble 5'-ribonucleotides which are of high practical value.

The intensive research undertaken by the present inventors in regard to methods of coating water-soluble 5'-ribonucleotides revealed that if 5'-ribonucleotides with a water content in a certain range and a particle diameter in a certain range are coated with an oil/fat and/or a wax, there is obtained a product which is more stable against phosphatase than is any other conventional product.

The present invention is therefore directed to a method of producing a seasoning composition, which comprises coating fine particles of water-soluble 5-'ribonucleotides having a total water content not exceeding about 14weight % and particle diameter not exceeding about 250 um with an oil/fat and/or a wax melting at a temperature between about 55° C. to about 90° C.

As examples of water-soluble 5'-ribonucleotides to be employed in the manufacture of seasoning composition according to the present invention, there may be mentioned 5'-isosinic acid, 5'-guanylic acid and their water-soluble salts [e.g. edible salts such as sodium salt, potassium salt, ammonium salt, lysine salt, histidine salt and arginine salt as well as mixtures thereof such as sodium 5'-ribonucleotide (a mixture of sodium 5'-inosinate and sodium 5'guanylate)]. In addition to such flavorant 5'-ribonucleotides, there may be added 5'-adenylic acid, 5'-uridylic acid and 5'-citidylic acid as well as edible salts thereof.

Before being coated with an oil/fat and/or a wax, water-soluble 5'-ribonucleotides are prepared to a total water content not exceeding about 14weight % and a particle size not exceeding about 250 $\mu$m. The term "total water content" as used herein means the total water contained in 5'-ribonucleotides irrespective of its origin, such as water of crystallization, adherent water and what not (hereinafter referred to merely as water content). The total water content can be determined by the method described in "The Japanese Standards of Food Additives, Fourth Edition", that is to say the water determination method (Karl Fischer method) or the loss-on-drying method (120° C., 4 hours).

As the above "The Japanese Standards of Food Additives" specifies that the water content of 5'-ribonucleotides shall be 28.5% or less for sodium 5'-inosinate and 25weight % or less for sodium 5'-guanylate. These substances are stable even in the presence of a substantial amount of water and 5'-ribonucleotides having such high water contents have heretofore been employed in the conventional coating processes. It is one of the salient features of the present invention that water-soluble 5'-ribonucleotides with low water contents not exceeding about 14weight % are used as raw materials. It is more desirable to use materials whose water content is within the range of about 2 to 7weight %.

The particle diameter of water-soluble 5'-ribonucleotides is not more than about 250 $\mu$m. Moreover, it is preferable that particles not larger than about 105 um in diameter and not smaller than 60 um account for at least about 80weight % and that the specific volume is within the range of about 1.5 to 2.5 ml/g. The shape of particles is preferably spherical or near-spherical.

For the preparation of fine particles of water-soluble 5'-ribonucleotides for use in accordance with the present invention, any method can be employed only if the abovementioned total water content and particle size requirements can be satisfied. For example, a spray-dried powder of its aqueous solution can be employed with advantage. For spray drying, the aqueous solution of 5'-ribonucleotides can be prepared to a concentration which ensures the necessary particle size upon drying and is generally prepared in range of 20 to 35 weight percent.

For control of water content, the drying temperature has important implications. In order to hold the water content as low as possible, the spray-dryer is operated to give a hot air inlet temperature of 150° to 250° C. and, generally, of 195° to 220° C. Of the resulting spray-dried product, particles passing a 250 um-opening sieve are used.

In conducting the above spray drying operation, the addition of a saccharide to the 5'-ribonucleotide system results in a further improvement in the affinity of the resulting fine particle for the oil/fat and/or the wax, assuring an improved coverage of the coating substance and a uniformity of coating result. In this connection, it is advantageous to prepare a mixed aqueous solution containing water-soluble soluble 5'-ribonucleotides and, based on each 100 parts (by weight) of the 5'-ribonucleotides, 0.1 to 20 parts (by weight) of a and saccharide spray-dry the mixed aqueous solution. As the saccharide mentioned above, there may be employed water-soluble starch obtained by gelatinization, dextrins [e.g. Dextrose Equivallent (DE) 20 or less, preferably DE 20~2]and other polysaccharides such as guar gum, gum arabic, locust bean gum, gum tragacanth, pectin, agar, carrageenan, xanthane gum, etc., and further such polysaccharides, oligosaccharides or monosaccharides as α, β, and γ-cyclodextrins, sucrose, lactose, glucose, frucose, galactose and so on.

The oil/fat and/or the wax which can be used for the purposes of the present invention is an edible one which melts at about 55° to 90° C. Examples of such oil/fat include vegetable and animal oils and fats, hydrogenation products thereof. Examples of such waxes include natural, edible waxes of animal, vegetable or mineral origin.

As specific examples of said oil/fat there may be mentioned hydrogenated beef tallow, hydrogenated fish oil, hydrogenated sperm oil, hydrogenated soybean oil, hydrogenated peanut oil, hydrogenatd castor oil, hydrogenated cottonseed oil, hydrogenated safflower oil, hydrogenated rice bran oil and so on. Examples of the natural wax include candelilla wax, rice wax, carnaube wax, bee's wax, paraffin wax and so on. Furthermore, fatty acids such as palmitic acid, stearic acid, behenic acid, etc. can also be employed. These oil/fat and/or wax may be used either alone or in combination for the purpose of adjusting the melting point to a desired temperature.

Provided that the above-mentioned melting point range is adhered to, fatty acid esters such as monoglycerides, diglycerides and triglycerides, sorbitan fatty acid esters, sucrose fatty acid esters, soybean lecithin and other emulsifying substances may be concomitantly used in suitable proportions for the purpose of improving the grain geometry and free-flowing property of the resulting coated powder.

As regards the coating method, there may be employed the spray granulation method in which the above-mentioned 5'-ribonucleotide powder is dispersed in a melt of said coating material at about 60° to 105° C., preferably at about 60° to 95° C. and the dispersion is sprayed into a cooling chamber maintained at 10° to 35° C., the method in which the above-mentioned hot dispersion is cooled to solidify and crushed, the method in which the fine particles of 5'-ribonucleotibes are floated in an air stream and the liquid coating material (melting by heating or dissolved in a suitable solvent) to coat the particles, or the coating method utilizing a coating pan. Among these methods, the spray granulation method using a disc or a nozzle is more preferable, because the fine particles of water-soluble material are more uniformly coated with an oil/fat and/or a wax. A rotary disc spray can be preferably carried out under the following operations:

Disc diameter: 100~200 mm
Temperature of disc: 130~200 ° C.
Rotary rate of disc: 1200~2200 rpm
Feed rate of dispersion: 200~500 ml/min.
Temperature of dispersion: 80~100° C.
Temperature of chamber: 10~35° C.

In addition to the coated product obtained as above, a second and a third coating layer may be further formed from the same or a different oleaginous material for an enhanced covering effect. Generally the coating material is used in the range of about 120 to 400 weight parts to each 100 weight parts of 5'-ribonucleotides.

In the seasoning composition according to the present invention, the 5'-ribonucleotide content of the final product is preferably in the range of about 20 to 45 weight %, and the amounts of the oil/fat and/or the wax and other additives, if any, are accordingly determined. If the coverage of the oil/fat and/or the wax material is less, the stabilizing effect against phosphatase is diminished. If the oil/fat and/or the wax is excessive, the coating material may deposit out as white spots when the seasoning composition is added to food, thus giving undesirable results in many instances. As to the particle size of the product, the coating thickness is greater as the particle diameter and the oil/fat and/or the wax content are increased but when the seasoning composition is added to food and subjected to milling or the like operation, there is an increased risk of the particles being mechanically destroyed so that the substantial residue rate of 5'-ribonucleotides is decreased. From the above points of view, coating is preferably carried out with particles in the range of not more than 500 μm and preferably from 250 μm to 150 μm.

Foods to which the seasoning composition according to the present invention is applicable with advantage are foods which are subjected to heating beyond the melting point of the oil/fat and/or the wax in the course of manufacture of foods which are cooked before eating at home. As examples of such foods, there may be mentioned fish paste products such as kamaboko, chikuwa, fried kamaboko, fish meat sausage, etc.; animal meat processed products such as sausage, ham, hamburger, meat patty, meat ball etc.; miso (fermented soybean paste) and delicacies; and ingredients for dumplings, shao-mai; batters for fried food, tempura (Japanese deep-fat fried food) and so on.

The seasoning composition according to the present invention is added to a mixing stage prior to heating in the manufacture of food. Even if phosphatase is present before heating, since the fine particles of water-soluble 5'-ribonucleotides are uniformly coated with the oil/fat and/or the wax, the 5'-ribonucleotides are not directly exposed to the enaymatic attack and decomposed. And, after the phosphatase has been inactivated by heating, the covering oleaginous material melts away and the water-soluble 5'-ribonucleotides are retained in stable state in the food to thereby display their flavorant effects.

The seasoning composition according to the present invention comprises fine particles of 5'-ribonucleotides coated with an oil/fat and/or a wax uniformly and with a high affinity for each other. Compared with the seasonings prepared by the conventional coating techniques, the release of 5'-ribonucleotides upon immersion in water at ambient temperature is well controlled so that the degradation by phosphatase is effectively prevented. Therefore, in the manufacture of foods which involves a heating stage, the addition of the seasonining composition even prior to the heating stage does not result in a degradation by phosphatase originating from food materials. Moreover, the oleaginous coating is dissolved only after phosphatase has been inactivated by heating, so that the satisfactory seasoning action of 5'-ribonucleotides can be exploited. In particular, the seasoning composition according to the present invention retains its coating quite intact even if it is subjected to mixing, milling and other mechanical operations during manufacture of fod so that it can be suitably used for the seasoning of steamed and kneaded fish paste products and various household dishes.

The following reference, experimental, use and working examples are furthet illustrative of the present invention.

REFERENCE EXAMPLE 1

Sample A

In 25 l of water was dissolved 10 kg of a mixture of sodium 5'-inosinate and sodium 5'-guanylate(Ribotide®, Takeda Chemical Industries, Ltd., Japan, adjusted to a water content of 24weight %) and the solution was adjusted to 65° C. and spray-dried under the two alternative heating conditions, namely the hot air inlet temperaturtes of (I) 200°–210° C. (Sample A-I) and (II) 120°–140° C. (Sample A-II), to give two kinds of spray-dried 5'-ribonucleotide products.

Sample B

A mixture of 9.77 kg of Ribotide® and 0.23 kg of dextrin (DE; 5–7, Pinedex®#100, Matsutani Chemical Kogyo K.K., Japan) was spray-dried under the same conditions as used for Sample A to give two kinds of products, namely Sample B-I (hot air inlet temperature: 200°–210° C. and Sample B-II (120°–140° C.).

Sample C

A mixture of 8 kg of Ribotide® and 2 kg of Pinedex® #100 was spray-dried under the same conditions as used for Sample A to give two kinds of fine particle products, namely Sample C-I (hot air inlet temperature: 200°–210° C.) and Sample C-II (120°–140° C.).

Each of the above spray-dried samples was sieved through a 250 μm-opening sieve and the particles passing the sieve were collected. The water content and the proportion of particles not larger than 105 um in the sample are shown in Table 1.

TABLE 1

| Sample | Drying conditions | Water content (wt. %) | Particles not larger than 105 μm (wt. %) | Dextrin content (%) |
|---|---|---|---|---|
| A-I | I | 3.8 | 98.1 | 0 |
| A-II | II | 10.2 | 95.5 | 0 |
| B-I | I | 4.2 | 94.3 | 5 |
| B-II | II | 14.6 | 92.2 | 5 |
| C-I | I | 6.7 | 67.4 | 25 |
| C-II | II | 16.2 | 65.3 | 25 |

REFERENCE EXAMPLE 2

Sample D

In 2500 ml of water were dissolved 970 g of sodium 5'-inosinate and 30 g of dextrin (Pinedex® #100) and the solution was heated to 80° C. and spray-dried under the two alterantive drying conditions of (I) 200°–210° C. (Sample D-I) and (II) 120°–125° C. (Sample D-II). The spray-dried products were respectively passed through a 250 μm-opening sieve to give two kinds of finely divided products. The water content of Sample D-I was 4.2% and that of Sample D-II was 5.3%.

Sample E

In the above procedure for preparation of Sample D, sodium 5'-guanylate was used in lieu of sodium 5'-inosinate to prepare two kinds of fine particle products, namely Sample E-I and Sample E-II, under otherwise the same conditions. The water content of Sample E-I was 4.2% and that of Sample E-II was 5.3%.

EXAMPLE 1

In 700 g portions of heat-melted carnauba wax (m.p. 83° C.) were evenly dispersed 300 g each of untreated Ribotide® and the spray-dried products of Reference Example 1 (Samples A-I and A-II) and each dispersion was adjusted to 95° C. Using a rotary disc spraying machine (disc diameter 15 cm, 2500 rpm), the dispersion was sprayed into a chamber maintained at 25° C. to give coated granules. Each product was sieved through a 500 μm-opening sieve. The particles passing the sieve accounted for 94% and the sodium 5'-ribonucleotide content of the product was 30.1% when untreated Ribotide® was used, 38.4% for Sample A-1 and 35.6% for Sample A-II.

EXAMPLE 2

In 700 g portions of heat-melted candelilla wax (m.p. 70° C.) were evenly dispersed 300 g each of untreated Ribotide® and the spray-dried products of Reference Example 1 (Samples B-I and B-II). Each dispersion was adjusted to 85° C. and granulated in the same manner as Example 1. The resulting products were respectively sieved through a 500 μm-opening sieve. The particles passing the sieve accounted for 95%. The sodium 5'-ribonucleotide content was 29.8% when untreated Ribotide® was used, 36.4% for Sample B-I and 34.0% for Sample B-II.

EXAMPLE 3

In 600 g portions of heat-melted hydrogenated rapeseed oil (m.p. 67° C.) were evenly dispersed 400 g each of the spray-dried products of Reference Example 1 (Samples A-I, A-II, C-I and C-II). Each dispersion was adjusted to 80° C. and granulated in the same method as Example 1. Each product was sieved through a 500 μm-opening sieve. The particles passing the sieve accounted for 93%. The sodium 5'-ribonucleotide content was 58.8% for Sample A-I, 47.5% for Sample A-II, 36.3% for Sample C-I and 30.9% for Sample C-II.

EXAMPLE 4

Heat-melted hydrogenated castor oil (m.p. 85° C.) was mixed with each of the spray-dried products of Reference Example 2 [Sample D-I and Sample E-I in two ratios of (a) 7:3 and (b) 6:4]. Each mixture was granulated in the same manner as Example 1. Each product was sieved through a 500 μm-opening sieve. The particles passing the sieve accounted for 92%. The sodium 5'-inosinate content was 38.0% for D-I(a) and 51.2% for D-I-(b). The sodium 5'-guanylate content was 37.6% for E-I(a) and 50.1% for E-I-(b).

EXAMPLE 5

Forty (40) kg of hydrogenated rapeseed oil (m.p. 67° C.) was heat-melted, thereto 38 kg of carnauba wax (m.p. 83° C.) was added stepwise and were mixed thoroughly under heating at a maximum temperature of 100° C. to give a melted mixture of the oil and the wax. In the heat-melted mixture was evenly dispersed 22 kg of the spray-dried product of Ribotide® which was prepared by the method of Reference Example 1 (B-1) and the dispersion was adjusted to 83 to 85° C. The dispersion was sprayed by using a rotary disc spraying machine to give coated granules. The operation was carried out under the following condition:

Disc: Corn type, disc diameter 15 cm
Temperature of disc: 160~170° C.
Rotary rate of disc: 1500±50rpm
Feed rate of dispersion: 350~380 ml/min.
Temperature of chamber: 25±5° C.

The thus obtained product was sieved through a 500 μm-opening sieve. The particles passing the sieve accounted for 98% and the sodium 5'-ribonucleotide content of the prouct was 26%.

Experimental Example 1

A paste was prepared from 6 kg of pork, 4 kg of beef, 5 kg of pork lard, 4 kg of ice-water, 1.5 kg of potato starch, 2 g of sodium nitrite, 20 g of smoke flavor and 10 g of sodium L-ascorbate in the conventional manner and the spray-dried samples A-I, B-I and C-I were added to portions of the paste at the level of 20 mg % as sodium 5'-ribonucleotide. After thorough kneading, each mixture was filled into a cellophane casing with a collapsed diameter of 23 mm, smoked at an increasing temperature of 50° to 70° C. over 90 minutes, and steamed at 80° C. for 30 minutes to prepare a sausage.

The sausages prepared as above were evaluated for taste and flavor by a panel of 10 expert tasters. As a result, no difference at all was found among the sample and the use of sodium 5'-ribonucleotides merely spray-dried did not lead to an improvement in flavor.

EXPERIMENTAL EXAMPLE 2

Each of the spray-dried products of Reference Example 1 (Samples C-I and C-II) (prior to sieving) was passed through a 500 μm-opening sieve and a 250 um-opening sieve and the fraction passing the former sieve and not passing the latter sieve was collected. In 1400 g portions of heat-melted hydrogenated beef tallow (m.p. 61° C.) were dispersed 600 g each of the powders and the resulting paste-like mixtures were adjusted to 75°–85° C. and granulated in the same manner as Example 1.

Each product was passed through a 500 μm-opening sieve. The particles passing the sieve accounted for 95%, and the sodium 5'-ribonucleotide content was 17.4% for C-I and 17.4% for C-II.

EXAMPLE OF USE 1

The untreated Ribotide®, the spray-dried sodium 5'-inosinate and sodium 5'-guanylate prepared in Reference Example 2 (Sample D and Sample E), and the coated sodium 5'-ribonucleotide products prepared in Examples 1 through 4 were respectively added in the course of manufacture of sausages and the 5'-ribonucleotide contents determined. At the same time, the products were compared for taste and flavor.

The formulation and method of manufacture of the sausages were identical with those mentioned in Experimental Example 1. The level of addition was invariably 20 mg% as sodium 5'-ribonucleotide. [Assay method of 5'-ribonucleotide content]

Twenty (20) grams of the sausage was homogenized with 100 ml of water, and the obtained suspension was boiled for 20 minutes to extract 5'-ribonucleotide. The extract solution was provided for the assay of 5'-ribonucleotide using high-performance liquid chromatography (HPLC). [Assay condition of HPLC]

Column: MCI GEL CDR10 (4φ×150 mm)
Temperature of column: room temperature
Mobile Phase: pH 4.5 0.5M acetic acid buffer
Pressure: 50 Kg/cm$^2$
Flow rate: 1.0 ml/min.
Detector : UV 254 nm
Sample volume: 20 μl
[Sensory test of sausage]

Each sausage sample obtained by Reference Examples and Examples was compared with untreated Ribotide® added sausage (control sample) in intensity of taste by a pair test method using 24-memberd panelers.

Each symbol in Table 2 has the following meaning:

(A): Number of panelers who replied that the control sample has stronger taste than a test sample.

(B): Number of panelers who replied that a test sample has stronger taste than the control sample.

\* : significant at 5% level

\*\*: significant at 1% level

The % residues of sodium 5'-ribonucleotide in the products and the results of the sensory test are set forth in Table 2. It is apparent that when the water content of sodium 5'-ribonucleotide prior to coating was not more than 6.7% and the 5'-ribonucleotide content of the coated product was not more than 38.4%, the % residue was high and the product had a more intense flavor.

TABLE 2

| No | Sample | % Residue of sodium 5'-ribonucleo-tide | Sensory (A) | Test (B) |
|----|--------|-------|---|---|
| 1 | Ribotide ® (control) | 30.4% | — | — |
| 2 | D-I Spray-dried (Reference Example 2) | 29.1 | 13 | 11 |
| 3 | E-I Spray-dried (Reference Example 4) | 29.6 | 11 | 13 |
| 4 | Coated Ribotide ® (Example 1) | 42.5 | 8 | 16 |
| 5 | Coated A-I (Example 1) | 70.2 | 6 | 18* |
| 6 | Coated A-II (Example 1) | 60.5 | 7 | 17 |
| 7 | Coated Ribotide ® (Example 2) | 43.7 | 9 | 15 |
| 8 | Coated B-I (Example 2) | 90.5 | 3 | 21** |
| 9 | Coated B-II (Example 2) | 36.5 | 10 | 14 |
| 10 | Coated A-I (Example 3) | 39.1 | 4 | 20** |
| 11 | Coated A-II (Example 3) | 70.0 | 6 | 18* |
| 12 | Coated C-I (Example 3) | 86.3 | 4 | 20** |
| 13 | Coated C-II (Example 3) | 35.4 | 11 | 13 |
| 14 | Coated D-I-a (Example 4) | 72.1 | 5 | 19** |
| 15 | Coated D-I-b (Example 4) | 53.5 | 6 | 18* |

TABLE 2-continued

| No | Sample | % Residue of sodium 5'-ribonucleotide | Sensory Test (A) | Test (B) |
|---|---|---|---|---|
| 16 | Coated E-I-a (Example 4) | 71.8 | 4 | 20** |
| 17 | Coated E-I-b (Example 4) | 49.4 | 7 | 17 |

EXAMPLE OF USE 2

A paste was prepared from 2.3 kg of pork (lean meat), 1.8 kg of milled chicken, 1.35 kg of pork (fatty meat), 600 g of potato starch, 160 g of sodium chloride, 24 g of sodium polyphosphate, 1.58 kg of ice-water, 0.8 g of sodium nitrite, 40 g of sucrose, 80 g of sausage spice mix, 38 g of sodium L-glutamate, 10 g of smoke flavor and 4 g of sodium L-abscorbate in the conventional manner. To portions of this paste were added the coated nucleotides listed in Table 3 (the samples prepared in Experimental Examples and Examples) at the level of 50 mg% as 5'-ribonucleotide. Each mixture was thoroughly kneaded.

Each of the above preparations was filled into a tubing with a collapsed diameter of 23 mm and dried at an ascending temperature of 50° C. to 70° C. over 90 minutes, followed by steaming at 80° C. for 40 minutes to give a sausage. The 5'-ribonucleotide content of each sausage was determined and the % residues were calculated and compared. At the same time, the products were compared for taste and flavor. The results are shown in Table 3.

It is apparent from the results that compared with the control sausages, the products according to the present invention are considerably high in % residue of 5'-ribonucleotide, stable, and more intense in taste and flavor.

TABLE 3

| No. | Sample | % Residue of ribonucleotide | Sensory Test Taste (A) | Taste (B) | Flavor (A) | Flavor (B) |
|---|---|---|---|---|---|---|
| 1 | Sodium 5'-ribonucleotide (control) | 4.7 | — | — | — | — |
| 2 | C-I Coated product (Example 3) | 75.2 | 5 | 19* | 3 | 21** |
| 3 | C-II Coated product (Example 3) | 24.3 | 9 | 15 | 7 | 17 |
| 4 | Coated sodium 5'-ribonucleotide (C-I) (Example 2) | 34.5 | 8 | 16 | 7 | 17 |
| 5 | Coated sodium 5'-ribonucleotide (C-II) (Example 2) | 16.4 | 9 | 15 | 9 | 15 |

EXAMPLE OF USE 3

Wheat flour (500 g), 250 g of egg and 500 ml of water were mixed, and to the mixture is added the coated product obtained or untreated Ribotide (control) at the level of 70 mg % as sodium 5'-ribonucleotide to give batter for tempura.

After each products was allowed to stand for 30 minutes, sodium 5'-ribonucleotide content of said batter were determined.

TABLE 4

| Sample | % Residue of sodium 5'-ribonucleotide |
|---|---|
| sodium 5'-ribonucleotide (control) | 0 |
| coated sodium 5'-ribonucleotide (Example 1, A-I) | 80.0 |

It is apparent from the results that compared with the control, the products according to the present invention is considerably high in % residue of sodium 5'-ribonucleotide, stable, and more intense in flavor.

EXAMPLE OF USE 4

The coated product obtained in Example 2 (B-1) or untreated Ribotide ® (control) was added to a mixture of 100 g of wheat flour, 40 g of egg, 260 ml of milk, 1.7 g of sodium chloride, 15 ml of salad oil and 2 g of mono sodium L-glutamate. The coated product and Ribotide ® were at the level of 30 mg% as sodium 5'-ribonucleotide, respectively.

The residue (%) of sodium 5'-ribonucleotide of the thus obtained batter for crepe was determined in a time course of 30 min., 1 h and 2 h. The results are shown in Table 5.

TABLE 5

| Sample | % Residue of sodium 5'-ribonucleotide | | |
|---|---|---|---|
| | 30 min. | 1 h. | 2 h. |
| Ribotide ® (control) | 0 | 0 | 0 |
| coated sodium 5'-ribonucleotide (Example 2, B-I) | 79.5 | 62.3 | 53.7 |

EXAMPLE OF USE 5

To an ingrediednt for shao-mai prepared from 140 g of milled pork, 20 g of frozen milled fish, 30 g of starch, 150 g of minced onion, 4 g of sucrose, 5 g of sodium chloride 25 ml of water and 0.2 g of mono sodium L-glutamate was added the coated product obtained in Example 4 (E-1) or untreated sodium 5'-guanylate (control) at the level of 30 mg% as sodium 5'-guanylate. After each ingredient was steamed for 15 minutes, the residue of sodium 5'-guanylate was determined. The results are shown in Table 6.

TABLE 6

| Sample | % Residue of sodium 5'-guanylate |
|---|---|
| sodium 5'-guanylate (control) | 45.5 |
| coated sodium 5'-guanylate (Example 4, D-I) | 95.7 |

What we claim is:

1. A method for producing a seasoning composition which comprises coating fine particles of a water-soluble 5'-ribonucleotide having a total water content of about 2 to 7 weight % with an oil/fat and/or a wax melting at a temperature between about 55° to about 90° C., the fine particles being spray-dried powders prepared from an aqueous solution of the 5'-ribonucleotide and having a particle diameter not exceeding about 250μm, and the amount of the coating material used being in the range of about 120 to 400 weight parts per 100 weight parts of 5'-ribonucleotide.

2. The method according to claim 1, wherein the 5'-ribonucleotides have particles not larger than about 105 μm in diameter and not smaller than 60 um whose content account for at least about 80weight %.

3. The method according to claim 1, wherein the spray-dried powders are those prepared from a mixed aqueous solution containing water-soluble 5'-ribonucleotides and, based on 100 parts by weight of the 5'-ribonucleotides, 0.1 to 20 parts by weight of a saccharide.

4. The method according to claim 3, wherein the saccharide is a dextrin with a dextrose equivalent of 20 or less.

5. The method according to claim 1, wherein the coating method is a spray granulation method which comprises dispersing fine particles of water-soluble 5'-ribonucleotides into a melt of oil/fat and/or wax at about 60 to 105° C. and disc-spraying said dispersion into a cooling chamber maintained at 10° to 35° C.

* * * * *